Nov. 3, 1970 G. C. HUTH 3,538,356
ENERGY CONVERTER
Filed Jan. 8, 1968
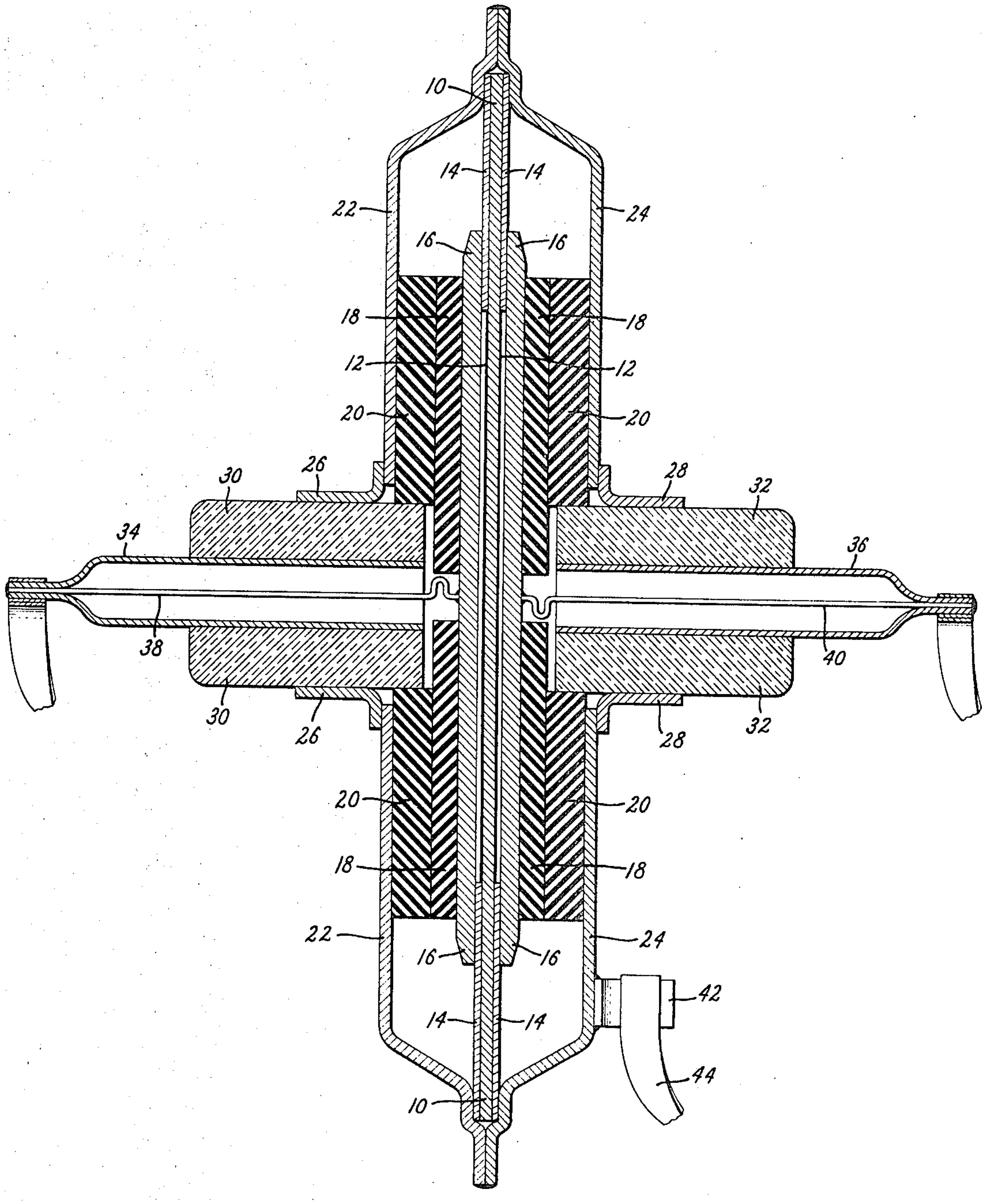
INVENTOR:
GERALD C. HUTH,
BY Henry W. Kaufmann
AGENT United States Patent Office 3,538,356
Patented Nov. 3, 1970

3,538,356
ENERGY CONVERTER

Gerald C. Huth, Rosemont, Pa., assignor to General Electric Company, a corporation of New York
Filed Jan. 8, 1968, Ser. No. 696,201
Int. Cl. G21h 1/00
U.S. Cl. 310—3 1 Claim

ABSTRACT OF THE DISCLOSURE

Source of low energy (e.g. 60 kv.) electrons is placed adjacent to deep diffused layer forming semiconductor junction. Electrons drift through junction, delivering energy to outside load. Specific embodiment: Prometheum 147 delivers electrons into 2-mil gallium-diffused layer in 6-mil silicon crystal having very thin (e.g. 1 micron) gold contact on gallium layer, vacuum evaporated manganese or aluminum on other side.

This invention pertains to the conversion into electrical energy of the energy of particles produced by radioactive disintegration of an element.

A variety of ways are known of producing electrical energy from the products of radioactive disintegration: their energy may be converted into heat and then into electricity by, e.g. approximately conventional thermal engines (albeit using somewhat unconventional working substances), or by thermocouples; they may be applied to luminescent materials to produce light, which is converted into electricity by photovoltaic cells; or, they may be applied directly to a semiconductor junction to produce pairs of holes and electrons, which move to appropriate electrodes to produce power in a connected external load.

Direct application of nuclear products to semiconductors has been of limited usefulness because the massive alpha particles and high-energy beta particles tend to destroy the crystalline structure on which the operativeness of the semiconductor depends. Such an alternative has been described by Rappaport (Physical Review vol. 93 January 1954 pp. 246–247). He uses a strontium 90-yttrium 90 source to bombard p-n junctions from the unalloyed or base side, and obtained an efficiency of 0.4 percent. He estimated that a wafer of optimum thickness would give an efficiency of 2 percent. Rappaport stated that radiation damage effects had been noted which might limit life to a value below that determined by the 20 year half-life of the source. Thus the general idea of a beta-fed energy converter has been known for some time.

Injection of beta particles into a crystal is not damaging if the energy of the electrons is moderate—not in excess of about 100 electron kv., for silicon. However, simple presence of the charge in a uniform region of the crystal merely permits the charge to diffuse toward the junction. If the diffusion time is comparable with the lifetime of the charge in that region the efficiency will be very low, since many of the charges originally available will not survive to pass the junction, and so contribute usefully to output. Also, the lifetime of the charges will be limited by irregularities in the crystal structure as are produced by defects in the structure itself or by random impurities.

I have found that in a deep diffused positive or P-type region in a comparatively thin crystal the lifetime of a charge is quite long; presumably this is a result of the "gettering" of stray impurities, which causes them to be concentrated near the surface from which diffusion has proceeded. (It is possible, but ordinarily not necessary, to lap or etch away a part of the surface in which this high concentration of impurities appears). The gradient of the concentration of the acceptor dope creates an electric field which directs beta particles toward the junction. Since the presence of the beta particles in the diffusion region is the source of the desired effect, I irradiate the wafer from the diffused side, making it desirable to have the diffused region of thickness suitable to absorb most electrons of energies less than those which are destructive of the crystal structure. In a specific example, by employing gallium-doped silicon fueled with prometheum 147, I have obtained an efficiency of 3 percent under visibly and remediably sub-optimum conditions.

Thus in general I achieve the object of producing a long-lived temperature-insensitive primary power source, which has no macroscopically moving or rapidly consumable parts and thus is capable of extremely high reliability.

For the better description and explanation of my invention I have provided a figure of drawing in which there is represented a central section of an embodiment of my invention having circular symmetry around an axis which, in the figure, is horizontal. In this figure, 10 represents a base sheet of nickel 0.004 inch thick, a circular disk in form. Upon either side of this, there is deposited a layer 12 of radioactive fuel. In the present instance this was prometheum 147, which in its spontaneous decomposition produces electrons having energies of about 60 electron kilovolts. It was in the form of a fine powder, affixed to the central part of each side of the disk 10 by a lacquer binder. The part of disk 10 so coated on each side was 0.682 inch in diameter; the rate of evolution of energy by the fuel was 15 millimicrowatts; it formed a layer estimated as 0.0003 inch thick. Gold washers 14, 0.002 inch thick, of inside diameter 0.682 inch, rested against the outer part of disk 10 not coated with fuel. Silicon semiconductor wafers 16, 0.875 inch in diameter and 0.006 inch thick, rested against washers 14. The side of each wafer 16 in contact with a washer 14 had been rendered P-type by diffusion of gallium into it to a depth of 0.002 inch, and had then been coated by vacuum evaporation with a layer of gold to a thickness of about one micron, i.e. 39.37 microinches, for the purpose of providing an electrical conductor sufficiently thick to possess adequately low resistance, and sufficiently thin to absorb as little as possible of the energy of the impinging electrons from fuel layers 12. The distal sides of wafers 16 remote from washers 14 were part of the negative or N-type silicon, of about one ohm-centimeter resistivity, which was the original wafer material into which the gallium was dffused. These distal sides of wafers 16 were coated by evaporation in vacuo with a layer of manganese to form an ohmic contact with the N-type material. Since there is no need for permeability of the coating of manganese, it may be made of any convenient thickness as required to provide good conductivity. Silicone rubber washers 18 and 20 serve to transmit to the entire assembly thus far described the pressure of shallow disk-shaped housings 22 and 24, which were of the alloy known as Kovar. These housings were 1.4 inches in diameter, having central holes to which were welded tubulations 26 and 28, respectively, also of Kovar, which were sealed to glass inserts 30 and 32, respectively, which were in turn sealed to Kovar tubes 34 and 36, respectively. Gold wires 38 and 40 were soldered to the manganese coatings of the N-type portions of wafers 16, and extended through Kovar tubes 34 and 36, respectively, which tubes were pinched and welded to the wires 38 and 40, forming an hermetic penetration. A Kovar tab 42 was welded to 24 to serve as an electrical terminal, a gold ribbon 44 being welded to tab 42.

After the assembly of the parts as indicated, the edges of housings 22 and 24 were welded together with a tungsten arc in an inert gas atmosphere. This had the advantage that all radioactive decomposition products would be retained within the container, for the safety of users in proximity to it. As further general protection for the assembly, it was coated with an epoxy cement.

Terminals 38 and 40 were tied together and used as a single terminal to form a pair with gold ribbon 44. Upon shortcircuit, the device produced 12 microamperes; at open circuit, it produced 150 microvolts. Variations of terminal voltage was approximately linear with current drawn, so that the device simulated a 150 microvolt source with 12.5 ohms series resistance. With a matched resistive load, it produced 75 microvolts across a load drawing 6 microamperes, or 450 micromicrowatts. Since the radioactive source 12 had an output of 15,000 micromicrowatts, this represented an efficiency of 3 percent. Theoretical considerations suggest that an efficiency of 10 percent may reasonably be expected. One probable source of losses in the embodiment described in nonuniform distribution of the coating 12 of fuel, which was observed to exist. Since the fuel emissions tend to be absorbed by the fuel itself, the efficiency of a fuel layer decreases with increasing thickness. This has the effect of reducing the efficiency of a fuel layer of nonuniform thickness below that which the same amount of fuel of uniform thickness dispersed over the same area would exhibit. However, even the efficiency obtained is adequate for useful purposes, since a number of cells such as this may readily be constructed and connected additively together. These units require no ventilation of fumes, dissipate no appreciable heat, and can operate equally well in a desk drawer or unprotected in outer space. Since they can occupy space of very low grade, i.e. of uncontrolled temperature or other characteristics, the necessity of providing an appreciable volume of the units is not objectionable.

While prometheum 147 was used in the embodiment described, other materials, such as tritium (hydrogen 3) and thulium 171 produce electrons of energy sufficiently low to be nondestructive of the semi-conductors employed in my invention, have reasonable half lives, and reasonable availability, and may be employed. Other possible fuel materialas which are less desirable from practical considerations are nickel 63, samarium 151, and europium 155.

It is desirable that the N-type base material should be of low resistivity in order to minimize the wasteful potential drop within it. Resistivities from 0.001 to 1.0 ohmcentimeters are of reasonable magnitude for this purpose. The doped P-type layer is preferably of such thickness as to stop at least a majority of beta particles normally incident upon it with an initial average energy in the range which is negligibly destructive of silicon crystal structure, i.e. about one hundred kiloelectronvolts or less. This in practice proves to range from more than one to less than eight one-thousandths of an inch. The ohmic contact to the base or N-type material has no unusual requirements; unlike those of some prior art devices, it is not required to permit the passage of particles through it (except for conventional electron flow for electrical conductivity). However, the metallic contact on the doped layer must be sufficiently thin to be permeable to electrons having energy in the range of interest, i.e. below one hundred kiloelectronvolts, and yet sufficient to give an electrical connection to the layer. It is believed that one reason for the observed fact, that lapping or etching away the surface layer having a high concentration of impurities contributes little to improved performance, may reflect the fact that the unlapped or unetched surface is sufficiently rough to provide greater area for contact with the metallic film.

It should be observed that the doping is by diffusion of an acceptor to produce a P-type material having monotonic concentration gradients suitable to propel negative charges to the junction. This is required by the fact that nondestructive negative particles are available from fuel sources. If nondestructive positive particles were available, one would follow the principles of my invention by starting with P-type base material and diffusing in a donor to produce N-type material with a dope concentration gradient. As regards fuel sources generally, since the energies of beta particles they emit have a range or distribution, it is not feasible to define them in terms of a maximum energy of any single emitted beta particle, but rather to limit them to those having an average emitted beta particle energy of less than 100 kiloelectronvolts. This is, of course, a flexible boundary; one could raise it at the cost of somewhat reduced life of the unit. The basic point is that this is the range which gives useful life.

I claim:

1. An electric power source comprising:

a circular disk (10) of nickel upon both sides of which there are deposited layers (12) of radioactive fuel comprising prometheum 147;

gold washers (14) each surrounding a said layer of radioactive fuel, in contact with the outer periphery of the circular disk, and coterminous with it;

wafers (16) of silicon semiconductor each in contact with an inner portion of a said gold washer, of diameter less than the outer diameter of the said gold washers, the surface of each wafer in contact with a gold washer being N-type in conductivity, and being coated with a thin layer of gold;

the opposite surface of each wafer being doped by diffusion into it of gallium to a depth less than the thickness of the wafer, and coated with a layer of manganese;

silicone rubber washers (18, 20) resting against the doped surface of each silicon wafer;

shallow disk-shaped metal housings (22, 24) surrounding the said parts, welded together at their edges to hold them in contact with the said gold washers at their periphery, and to cause the metal housings to contact the said silicone rubber washers to maiantain pressure against them;

first tubulations (26, 28) of metal each welded to surround a central hole in a shallow disk-shaped metal housing, in which glass inserts (30, 32) are hermetically sealed to a first tubulation, and to one of second tubulations (34, 36) of metal each disposed centrally in a glass insert; and gold wires (38, 40) each pinched and welded in and to a hermetically sealed end of a second tubulation, each extending through that second tubulation to and soldered to a said layer of manganese.

References Cited

UNITED STATES PATENTS

| | | |
|---|---|---|
| 2,629,802 | 2/1953 | Pantchechnikoff. |
| 2,672,528 | 3/1954 | Shockley. |
| 2,847,585 | 8/1958 | Christian. |
| 2,958,798 | 11/1960 | Anton. |

FOREIGN PATENTS

| | | |
|---|---|---|
| 761,404 | 11/1956 | Great Britain. |

RODNEY D. BENNETT, Jr., Primary Examiner

B. L. RIBANDO, Assistant Examiner